United States Patent [19]

Giguere

[11] Patent Number: 4,509,315
[45] Date of Patent: Apr. 9, 1985

[54] BUSHWOOD MOWING APPARATUS

[76] Inventor: Noëlli Giguere, St-Adrien de Ham (Richmond), Quebec J0A 1C0, Canada

[21] Appl. No.: 555,772

[22] Filed: Nov. 28, 1983

[51] Int. Cl.³ .......................................... A01D 35/262
[52] U.S. Cl. ..................................... 56/10.7; 56/255; 56/320.1
[58] Field of Search ............... 56/320.1, 320.2, 10.7, 56/255, 16.9, 333, 337

[56] References Cited

U.S. PATENT DOCUMENTS

| | | | |
|---|---|---|---|
| 2,357,725 | 10/1958 | Canfield | 56/320.1 |
| 2,502,696 | 4/1950 | Barnes | 56/255 |
| 2,514,407 | 7/1950 | May | 56/255 |
| 2,539,779 | 1/1951 | Grosso | 56/255 |
| 2,636,333 | 4/1953 | Michaels | 56/333 |
| 2,724,229 | 11/1955 | Graham | 56/255 |
| 2,763,116 | 9/1956 | Flinchbaugh et al. | 56/255 |
| 2,992,524 | 7/1961 | Stabnu | 56/320.1 |
| 3,057,140 | 10/1962 | Ridenour et al. | 56/255 |
| 3,087,296 | 4/1963 | Cowles | 56/10.7 |
| 3,103,093 | 9/1963 | House, Jr. | 56/295 |
| 3,111,800 | 11/1963 | Quianthy | 56/222 |
| 3,123,962 | 3/1964 | Hester | 56/255 |
| 3,559,385 | 2/1971 | Eaton | 56/10.7 |
| 3,590,926 | 7/1971 | Tepera | 56/295 |
| 3,624,698 | 11/1971 | Storm | 56/10.7 |
| 3,949,539 | 4/1976 | Cartner | 56/10.7 |

Primary Examiner—Paul J. Hirsch

[57] ABSTRACT

A mowing apparatus to cut various kinds of vegetation is disclosed, comprising a floating work head mounted at the working end of an articulated hydraulic arm. The work head has a horizontal rotating element operatively connected to a power source and carrying at both its opposite ends a pivotally-secured cutting blade. The work head is formed with a semi-circular front upper edge and two laterally-spaced forwardly-extending projections, the latter defining, along with the sides of the front upper edge, a V-shape indent. The projections channel the growth to be cut towards the indents, as does the upper edge. The arc of the cutting blades is forward of the front upper edge.

5 Claims, 5 Drawing Figures

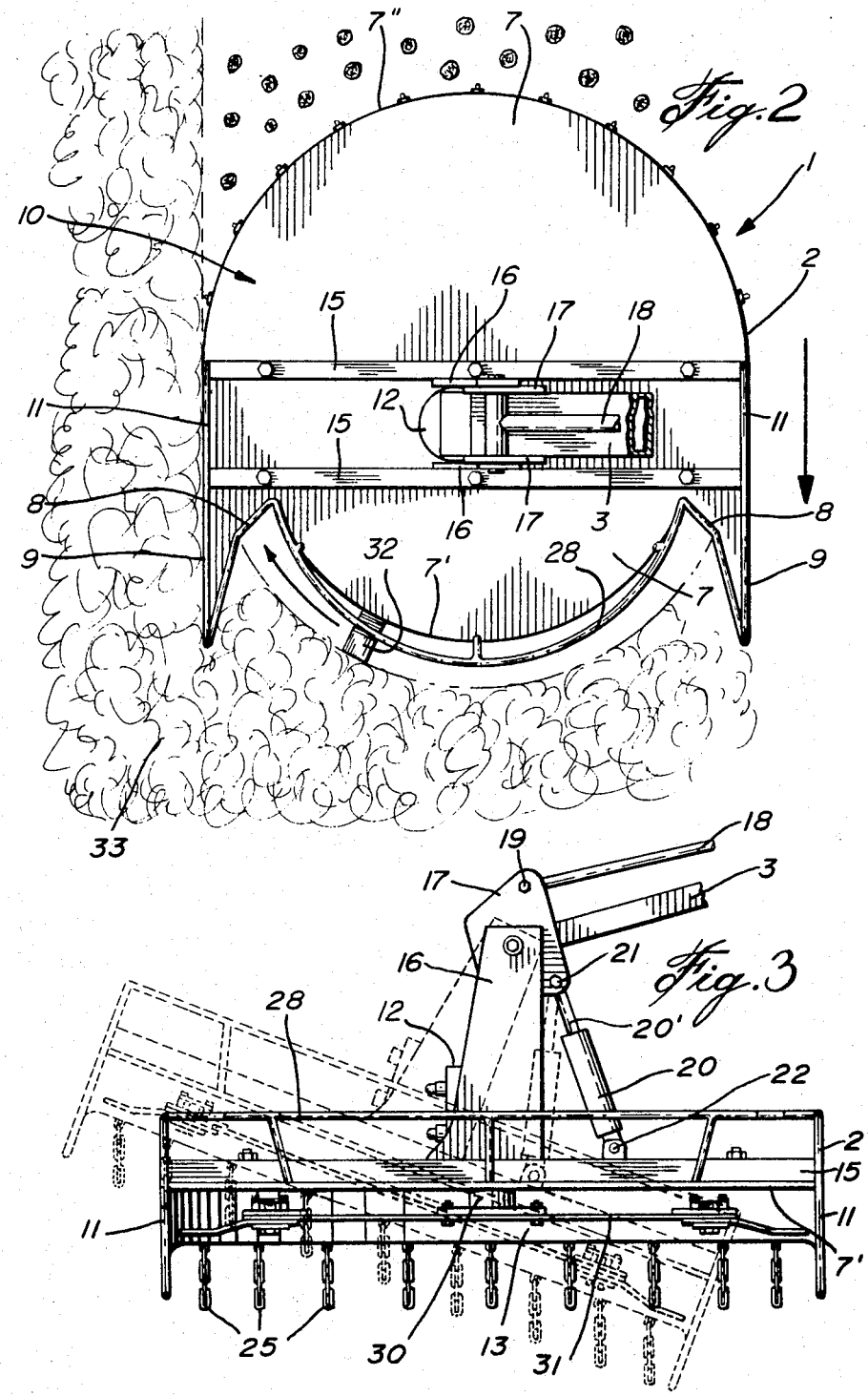

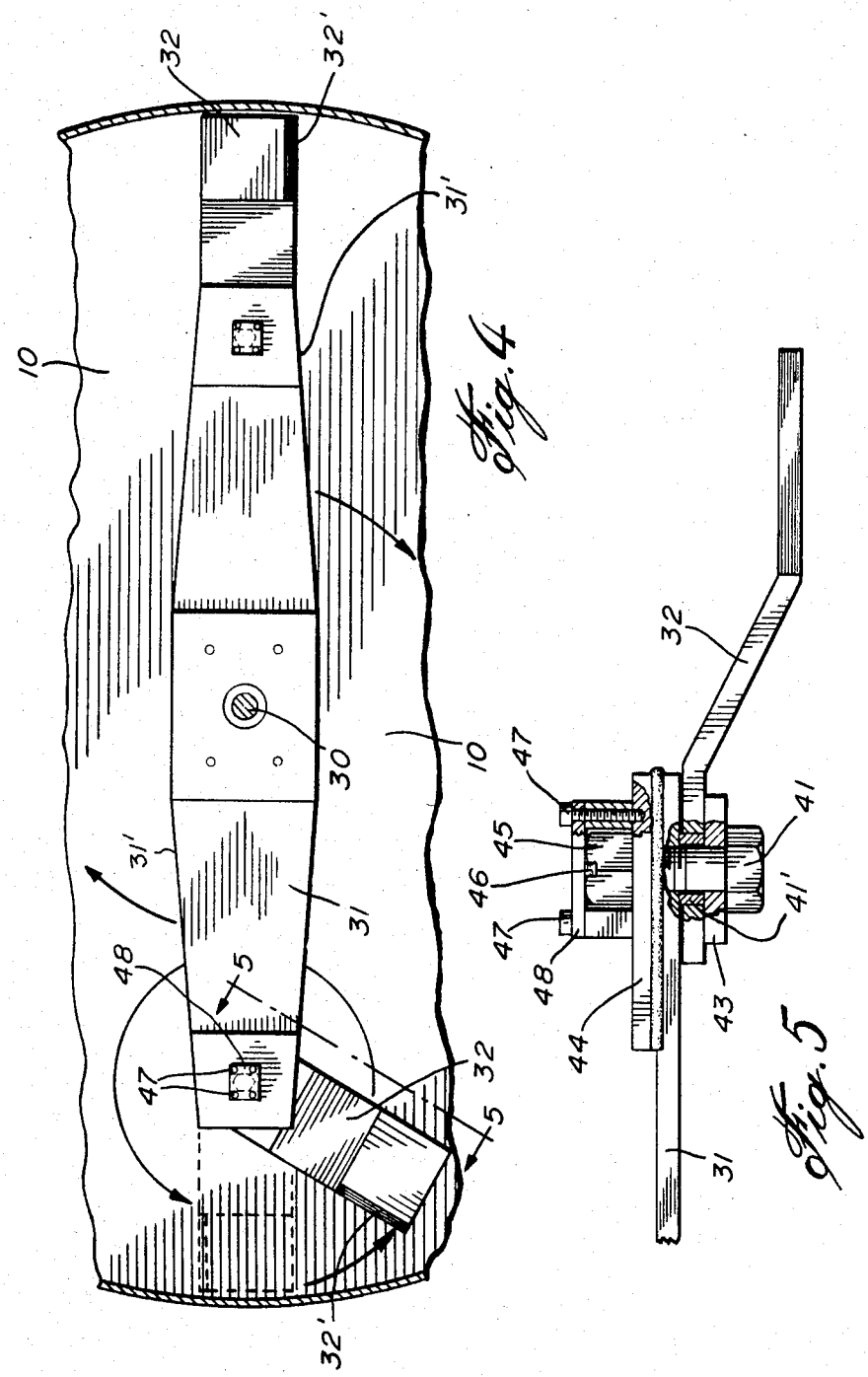

BUSHWOOD MOWING APPARATUS

FIELD OF THE INVENTION

This invention relates to mowing machines in general and, more specifically, to a large mowing apparatus adapted to cut down bushwood, bushes and various kinds of stubborn growths.

BACKGROUND OF THE INVENTION

The machine disclosed herein is directed to a mechanized means for cutting small trees, saplings, bushes, shrubs, weeds, etc., which commonly grow on roadsides, highway medians and railroad tracks. It is frequently necessary to trim or remove such arboreal and vegetable growth in these locations, because the growth, if thick enough, or tall enough, can obstruct vision, cause hayfever and be generally unsightly. Heretofore, such tasks were done either manually (with a chain-saw), requiring excessive man-hours, or by machines which are relatively efficient but nevertheless have certain disadvantages. For example, the Canadian Patent to Engler issued Jan. 7, 1964 (No. 677,778) teaches a mowing device having a shock-resistant blade hub and cutting blades for mowing grass but not suitable for cutting heavier vegetation.

Another device, that of U.S. patent to Teagle, issued Feb. 21, 1978 (U.S. Pat. No. 4,074,510) discloses a machine adapted to cooperatively function with a tractor and having a complex rotary cutter which would be expensive to manufacture.

Yet another U.S. patent, issued in the name of Storm on Nov. 30, 1971 (U.S. Pat. No. 3,624,698), discloses a cutting element at the end of an articulated boom, the latter being mounted on a tractor by means of an "outrigger frame". However, the cutting element has to be guided very precisely by an operator in order to cut clean swaths through bush due to its conventional circular shape.

OBJECTS OF THE INVENTION

In view of the above, it is a prime object of the instant invention to provide a mowing apparatus which will easily and quickly cut bushwood, shrubs, bushes, weeds, saplings and trees up to 7 inches in diameter.

It is another object of the invention to provide a mowing apparatus having a floating work head which is well adapted to function in cooperation with any kind of work-related machine.

It is yet another object of the present invention to provide a mowing apparatus which is much more efficient than presently-used methods.

It is still another object of the present invention to provide a mowing apparatus which eliminates chemical spraying.

It is a still further object of the invention to provide a mowing apparatus which is adapted to operate in such difficult-to-reach areas as cross-country ski trails, cleared strips for electric power lines, ditches, etc.

SUMMARY OF THE INVENTION

In broad terms, the above objects and other advantages of the invention are realized according to a preferred embodiment comprising a floating work head, preferably mounted on an articulated hydraulic arm, the latter being connected to a work vehicle of any conventional type. The work head is pivotally mounted to the working end of the hydraulic arm and includes a rigid housing having a front end and a rear end.

A central and vertical shaft is rotatively journalled in the housing, being fixed at its upper end to a power source and carrying at its lower end a diametrically-extending single rotating element having balanced opposite ends. Preferably, both these opposite ends are provided with pivotally-secured cutting blades which are yieldably rigid under the effect of centrifugal force, thereby evading possible damage if a cutting portion strikes a hard object, such as a stone. Pivot mounting means are furnished for both cutting portions to increase the safe usage thereof.

The essential feature of the invention is embodied at the front cutting end of the housing, which feature includes a generally semi-circular front upper edge terminating at both lateral sides of the housing in a rearwardly-pointing V-shape indent formed by the front upper edge and a triangular lateral projection of the housing on each side thereof. The front upper edge is located inwardly of the outer ends of the cutting blade arc, whereby the outer ends project beyond the front upper edge to efficiently cut a path through the growth to be removed as the apparatus moves forwardly.

As the cutting blades rotate, the stalks or trunks (up to a certain diameter, of course) of the growth will be directed towards one of the indents, because of the curved front edge. The pointed lateral projections of the housing will achieve the same result as the apparatus moves forwardly.

Preferably, the front upper edge and the lateral projections are built with upwardly-extending and forwardly-inclined rail means both to channel the growth towards the cutting blades and to protect the top of the housing.

BRIEF DESCRIPTION OF THE DRAWINGS

The above will be more clearly understood by having referral to the preferred embodiment of the invention, illustrated by way of the accompanying drawings, in which:

FIG. 2 is a top plan view of the floating work head cutting a swath through shrubbery;

FIG. 3 is a front elevation of the work head, also showing in dashed outline how it can be tilted;

FIG. 4 is a bottom plan view of the cutting bar and the two cutting blades; and

FIG. 5 is an elevation of one end of the cutting bar, the associated cutting blade and the pivot-mounting means with parts broken away.

Like numerals indicate like elements throughout the drawings.

DETAILED DESCRIPTION OF THE PREFERRED EMBODIMENT

Figure 1:
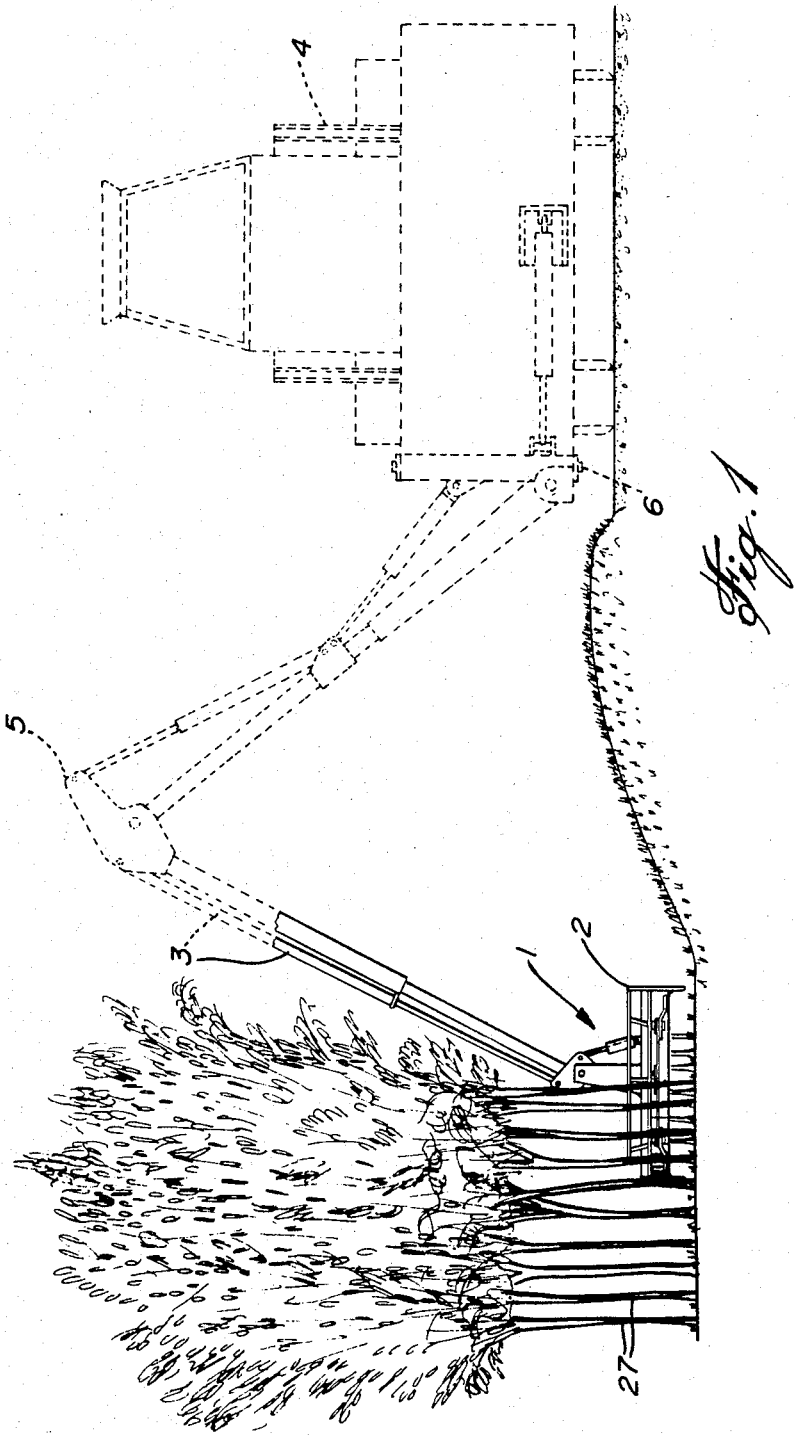
FIG. 1 is an elevation view of the floating work head cutting a stand of trees, also showing the hydraulic arm and a work-related machine in dashed outline.

FIG. 1 illustrates the mowing apparatus 1. The latter is comprised of a floating work head 2, an articulated hydraulic arm 3 and a work-related machine 4. The latter may or may not be provided with a counterweight (none is shown), depending on its stability characteristics, center of gravity, etc. Arm 3 preferably has an elbow 5, thereby allowing the work head 2 to to be positioned both vertically and laterally away from machine 4. It is also pivotally secured at 6 to further allow longitudinal movement of the work head relative to machine 4.

Referring now to FIGS. 2 and 3, the work head 2 is more advantageously shown, having a housing 10 and a top surface 7. The central portion of the housing 10 has rigidly secured thereto a pair of spaced transverse ribs 15, which fixedly retain a pair of spaced upwardly-projecting rigid plates 16. The upper end of these plates 16 pivotally retains the working end of arm 3, consisting of a pair of spaced pivot members 17, a hydraulic cylinder rod 18 pivotally secured at 19 and another hydraulic cylinder 20 having its rod 20' secured at 21 and its opposite end pivotally attached to housing 10 at 22. The second cylinder 20 allows for tilting the work head 2 relative to the horizontal plane, as shown by the outline in FIG. 3.

A motor 12 is mounted on housing 10 between the lower ends of plates 16.

A drive shaft 30 is journalled in housing 10, being operatively connected to the motor. A shaft driven elongated flat bar 31 is fixedly secured to shaft 30 at its center and is adapted for horizontal bodily rotation therewith underneath the top surface 7 of housing 10. As best seen in FIG. 4, bar 31 extends diametrically and its ends are provided with cutting blades 32. The latter are pivotally mounted by a pivot mounting means described fully below, whereby they are held yieldably straight by centrifugal force as element 31 rotates (although blades 32 are shown as being sharp on only one lateral edge 32', it is foreseen to have a reversible motor and double-edged blades for rotation in both directions).

Housing 10 has a semi-circular front upper edge 7' and a rear edge 7", also semi-circular in shape.

On either side, front edge 7' forms a generally rearwardly-pointing V-shape indent 8 in conjunction with a respective lateral, triangular and forwardly-extending projection 9. As seen in FIG. 2, cutting blades 32 define a rotational arc extending slightly forwardly of front edge 7'. It will be readily appreciated that blades 32 effectively slice through shrubbery 33 and one of the projections 9 direct growth into the corresponding indent 8 to be held and cut there in a shearing action, depending on the rotational direction of blades 32. Once cut, shrubbery 33 falls and is slashed and communited under housing 10 by the leading edges 31' of bar 31.

Blades 32 are designed to rotate at approximately 1200 r.p.m. and, it has been found, can efficiently cut trees 27 of up to seven inches in diameter.

Housing 10 further includes lateral walls 11, vertically forwardly projecting rails 28 and a rear semi-circular wall 13 depending from rear edge 7", wall 13 being spaced rearwardly away from the cutting arc of blades 32 to protect the latter. Wall 13 itself is provided with a plurality of hung chains 25 to prevent debris from flying out of the rear of housing 10.

Referring to FIGS. 4 and 5, there is shown the pivot mounting means for blades 32. The means includes a bolt 41 extending through a hole made in both blade 32 and bar 31, a bushing 41' surrounding bolt 41 and located in the hole of blade 32, a washer 43 between the bolt and the blade, a flat, rigid strip 44 welded on three sides to the upper surface of element 31, and a nut 45 threaded onto bolt 41. Bushing 41' is made of softer material than blade 32 and bolt 41. Cap assembly 48 is a safety feature, since it positively prevents accidental disassembly of blade 32 from bar 31 under centrifugal force. Nut 45 is removably lockingly held in place by a small key 46 adapted to engage a slot in bolt 41 and nut 45. Key 46 is part of a cap assembly 48 fixed to strip 44 by four screws 47.

Finally, as afore mentioned, the front end of housing 10 is provided with an upwardly-outwardly-extending railing 28, as best seen in FIG. 3.

What I claim is:

1. In combination, a mowing device consisting of a floating work head and a work-related vehicle, comprising: a multiple-lever arm to movably manipulate said work head against bush to be mown; said head comprising a housing having a top wall with semi-circular front and rear ends, lateral walls and a rear wall, a motor fixedly secured to said top wall and having a shaft extending through said top wall below the same, an elongated flat rigid bar fixed to said shaft at its center and rotatable in a plane parallel to the plane defined by said top wall, a cutting blade pivoted to each end of said bar and defining a full cutting arc outwardly of said front end but inwardly of said rear end; said front end having two end portions projecting forwardly outwardly from said cutting arc and defining inner indents adapted to retain said bush to be mown therewithin upon forward progression of said work head; said bar defining slashing and comminuting leading edges, each cutting blade mounted on said bar at its inner end portion for full rotation in a plane parallel to said bar about a pivotal member protruding from the top of said bar and from the bottom of said blade, each of said blades having a free end portion parallel to said bar and which is downwardly offset from said blade inner end portion to fully shield the lower end of said pivotal member, wherein said bush slidingly brought within said indent is shearingly struck by one said blade which may yieldingly pivot inwardly depending upon the resistance of said bush and is thereafter struck by the other said blade which may also yieldingly pivot inwardly and again by the said one blade having outwardly pivoted under centrifugal force which may again pivot inwardly, sucessively, until the bush is completely cut, and the leading edges of said bar subsequently slash and comminute the cut bush.

2. The apparatus as defined in claim 1, wherein said pivotal member includes a bolt extending through said blade and said bar, a bushing, engaged in a mating opening within said blade and surrounding said bolt, said bushing being of a thickness slightly greater than that of said blade to allow some play of said blade at right angle to the plane of said top wall, a nut threaded on the bolt on the side of said top wall, and a locking member removably lockingly securing said nut in place.

3. The apparatus as defined in claim 2, wherein said pivotal member further includes a cap assembly for shielding said nut against said bush, said cap assembly comprising a centrally-bored plate, fixedly secured to said bar around said nut, and an open box-like casing fixedly secured to said plate, wherein the casing allows access to said locking member.

4. The apparatus as defined in claim 1, further including means to prevent debris from flying out rearwardly and to level off the surface of ground that was mown, consisting of a plurality of spaced, heavy chains freely downwardly depending from said rear end.

5. The apparatus as defined in claim 1, wherein said housing front end further includes upwardly-projecting rigid rails extending radially outwardly of said front end but radially inwardly of said cutting arc.

* * * * *